(12) United States Patent
Morin et al.

(10) Patent No.: US 7,871,692 B2
(45) Date of Patent: Jan. 18, 2011

(54) MULTI-PLY TISSUE PAPER, PAPER CONVERTING DEVICE AND METHOD FOR PRODUCING A MULTI-PLY TISSUE PAPER

(75) Inventors: Emmanuelle Morin, Vanves (FR); Ferdinand Hein, Mannheim (DE); Bernd Lofink, Dirmstein (DE); Richard Kiehlmann, Sandhausen (DE)

(73) Assignee: SCA Hygiene Products GmbH, Mannheim (DE)

( * ) Notice: Subject to any disclaimer, the term of this patent is extended or adjusted under 35 U.S.C. 154(b) by 374 days.

(21) Appl. No.: 11/917,460

(22) PCT Filed: Jun. 21, 2005

(86) PCT No.: PCT/EP2005/006679
§ 371 (c)(1),
(2), (4) Date: Jan. 31, 2008

(87) PCT Pub. No.: WO2006/136186
PCT Pub. Date: Dec. 28, 2006

(65) Prior Publication Data
US 2009/0311481 A1     Dec. 17, 2009

(51) Int. Cl.
*B32B 27/14* (2006.01)
*B32B 3/00* (2006.01)
*B31F 1/12* (2006.01)
*D21H 27/40* (2006.01)

(52) U.S. Cl. .................. 428/172; 428/153; 428/154; 428/198

(58) Field of Classification Search .............. 428/153, 428/154, 172, 198, 166; 162/109, 111, 113
See application file for complete search history.

(56) References Cited

U.S. PATENT DOCUMENTS 3,867,225 A * 2/1975 Nystrand .................... 156/209
5,840,404 A   11/1998 Graff et al.

(Continued)

FOREIGN PATENT DOCUMENTS

EP   1209289 A   5/2002
EP   1321576 A   6/2003

(Continued)

OTHER PUBLICATIONS

Mar. 16, 2006 International Search Report & Written Opinion in corresponding PCT application PCT/EP2005/006679.

(Continued)

*Primary Examiner*—David R Sample
*Assistant Examiner*—Catherine Simone
(74) *Attorney, Agent, or Firm*—Young & Thompson

(57) ABSTRACT

A multi-ply web of tissue paper having at least two plies comprising a first web (2a) consisting of at least one ply and being provided with a first embossing pattern forming cushions (24) limited by regions (22) of compressed material and a second web (3a) having at least one ply and being provided with a second pattern with protrusions (32) of compressed material. The first web and the second web are combined together such that the protrusions of compressed material (32) of the second web (3a) are positioned inside the cushions (24) limited by the regions (22) of compressed material (22). Further, the invention relates to a paper converting device and a method for producing such product.

18 Claims, 4 Drawing Sheets

U.S. PATENT DOCUMENTS

| | | | |
|---|---|---|---|
| 6,136,413 | A | 10/2000 | Le Port et al. |
| 6,251,207 | B1 * | 6/2001 | Schultz et al. .............. 156/209 |
| 6,261,666 | B1 * | 7/2001 | Enderby et al. ............. 428/172 |
| 6,395,133 | B1 | 5/2002 | McNeil |
| 6,681,826 | B1 * | 1/2004 | Biagiotti ..................... 156/470 |
| 2002/0048662 | A1 * | 4/2002 | Bredahl et al. .............. 428/195 |
| 2003/0021953 | A1 | 1/2003 | Graff |
| 2003/0026953 | A1 | 2/2003 | Heinz-Jurgen et al. |

OTHER PUBLICATIONS

Sep. 28, 2007 International Report on Patentability in corresponding PCT application PCT/EP2005/006679.

* cited by examiner

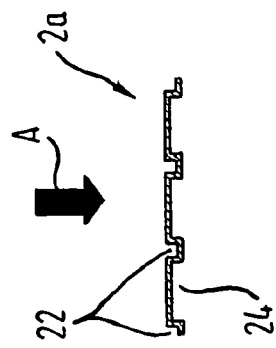
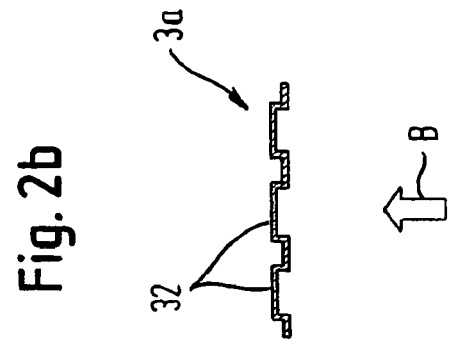
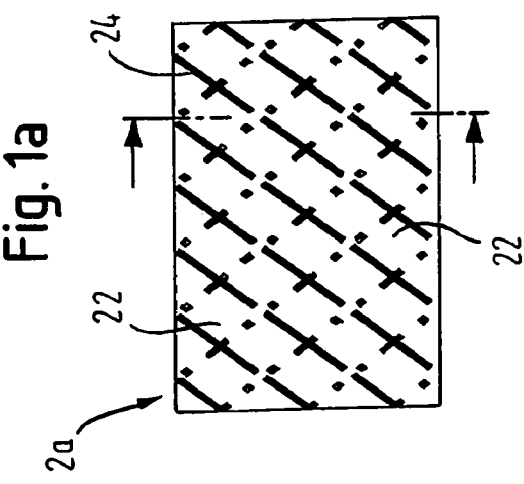
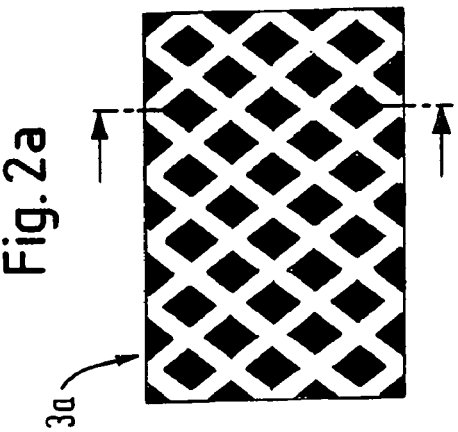

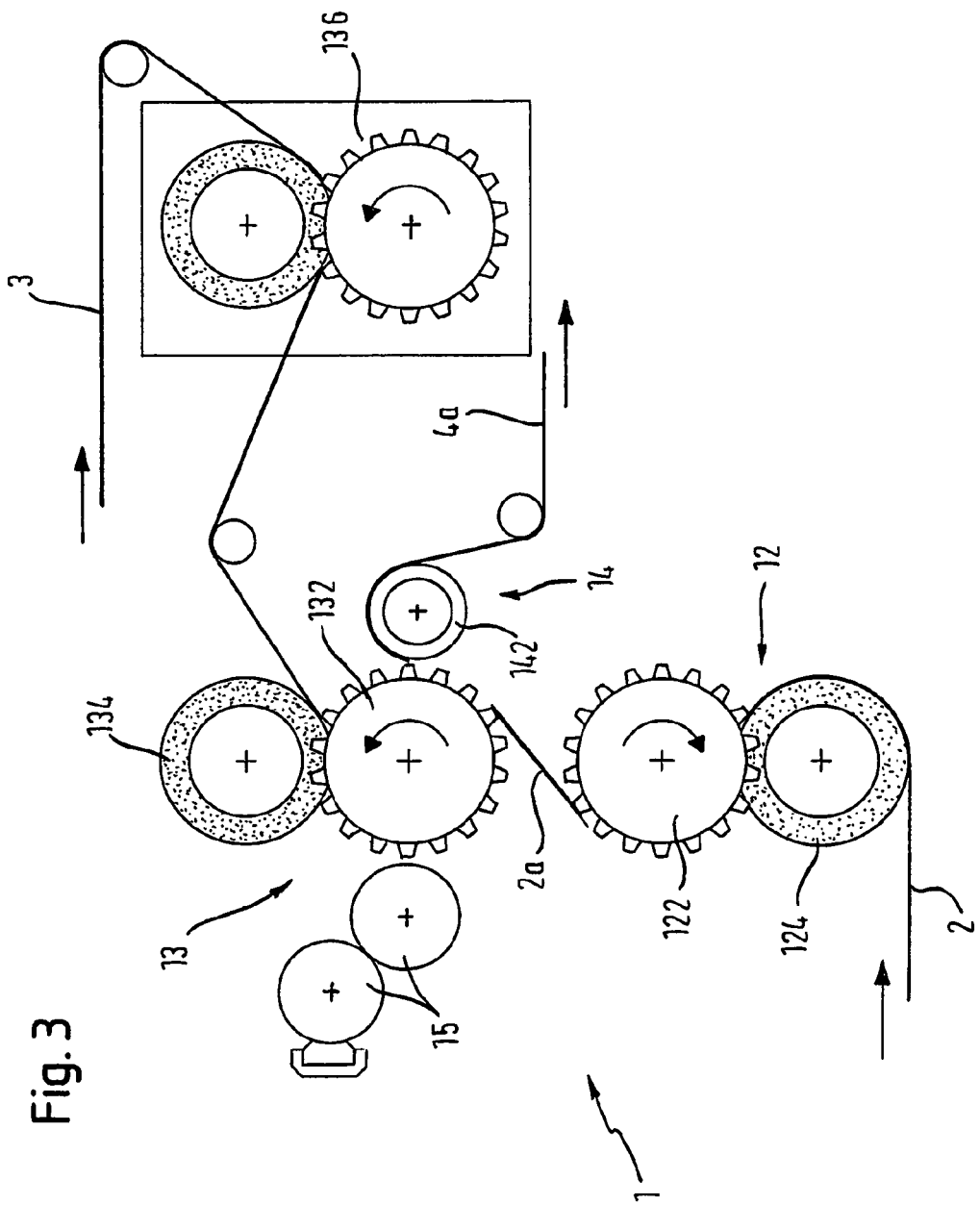

MULTI-PLY TISSUE PAPER, PAPER CONVERTING DEVICE AND METHOD FOR PRODUCING A MULTI-PLY TISSUE PAPER

FIELD OF THE INVENTION

The invention relates to a multi-ply web of tissue paper, a method for manufacturing the same and a paper converting device for a multi-ply web of tissue paper.

Such products are largely planar products which are usually increased in terms of their volume by means of an embossing process. This increasing volume (bulking) may effect a better appearance on the one hand, and technical properties on the other. If a tissue or similar paper product for example is provided with an embossment, the properties of touch and feel can thereby be improved in addition to an enhanced appearance. As well as these properties of touch, the products absorption properties may also be improved by the conversion of the products as a result of embossing. As far as a method and product according to the invention are concerned, a wide variety of materials is relevant, particularly e.g. tissue paper (creped or uncreped, wet-laid, single-layered or multi-layered), absorbent cotton; textile webs, woven fabrics, so-called "non-wovens" (e.g. dry-laid), textile laminates; or plastic materials as a foil or fiber composite.

In the field of papers for sanitary or domestic use, such as toilette paper or paper towel, it is known to produce paper sheets consisting of several plies of absorbent paper, for example made of creped cellulose web with a density of between 10 and 60 g/m$^2$ especially of between 12 and 40 g/m$^2$ and provided with protuberances which are obtained by embossing.

PRIOR ART

In multi-layer products, tissue is embossed using a single nip or multi-nip embossing. The ply bonding of the single plies is provided by a mechanical embossing or by using adhesive. In the case of three or multi-ply products, a plurality of plies are generally embossed together to provide volume to the product. However, the embossing usually contributes to a rough feeling of the product. On the other hand, it is possible to use a microembossing with a high density of protuberances to provide an embossed product which feels soft. However, microembossed paper feels as if could not absorb enough liquid. Therefore, there is a constant desire to provide a tissue product with a high softness surface and a sufficient bulk.

WO 99/45205 describes a multi-ply tissue product with two embossed outer plies and a middle ply without embossing. Each of the outer plies is glue bonded to the middle ply.

There are several examples in the prior art, where two webs of tissue paper are embossed such that protrusions formed on an embossing roll generate protuberances which are sized such that the two webs can be combined together so that the protuberances are nested into each other.

In a constant desire to provide a tissue product with a high softness surface and a sufficient bulk, EP 1 209 289 A1 suggests a special structure with a first web having micro protuberances which extend into cushions formed into a second web having a macro embossed pattern.

SUMMARY OF THE INVENTION

It is the object of the invention to provide a multi-ply tissue paper which combines in an advantageous way high strength and absorption, softness, haptic and necessary bulk thickness to provide a good feeling to the user. Moreover the product should have a good optical appearance and a so-called reversibility, which means that both sides are clearly different in view of their pattern and can independently be either the top ply or the bottom ply. Such kind of tissue products can be wound in either direction thereby resulting two different products each having a good appearance.

This object is solved by a multi-ply tissue paper product, a multi-ply tissue paper product and a paper converting device for a multi-ply web of tissue paper.

The invention resides in the provision of a tissue paper having at least two plies comprising a first web and a second web which are combined together. The first web consists of at least one ply and is provided with a first embossing pattern forming cushions limited by regions of compressed material. The second web has at least one ply and is provided with a second pattern with protrusions of compressed material. The first and the second web are combined together such that the protrusions of compressed material of the second web are positioned mainly inside the cushions formed in the first web.

It is the basic idea of the invention to provide, in the first web, cushions limited by regions of compressed material. This can be achieved by applying a so-called female embossing pattern using a female embossing tool. Such a female embossing tool has recesses into which the material of the planar initial product is pressed. When the embossing tool in form of an embossing roller is positioned against an anvil roller, the web material that enters the recesses is compressed to a much lower degree than the remaining material of the web. Therefore, the material around the recesses in the female embossing tool becomes compressed. For an explanation of a female embossing tool and the product obtained therefrom, reference is made to U.S. Pat. No. 6,440,564 B1.

The inventive product forms cushions in the first web which are surrounded by regions of compressed material. The male protrusions serve to stabilize the cushions so that the optical appearance of the first web having cushions surrounded by regions of compressed material is obtained. It is preferred that the male protrusions should have less sharper corners compared with the female cushions. When combining the plies together, the male protrusions do not destroy the optical appearance of the cushions.

The product has two different optical appearances of the top side and the back side. This improves the overall appearance and makes it possible to reverse top side and back side in the product.

The paper converting device comprises a first embossing unit for embossing a first web having at least one ply, wherein the first embossing unit applies a first pattern comprising cushions which are limited by regions of compressed material. This is typical for a female embossing unit. The paper converting device further comprises a second embossing unit for embossing a second web having at least one ply and applying a second pattern comprising protrusions of compressed material. This is formed by a male embossing unit. The protrusions are sized to fit into the cushions. Further, the paper converting device according to the invention comprises a ply bonding unit for combining the first and the second embossed web together in a nested configuration such that the protrusions of the compressed material are placed inside the cushions.

The method for producing the inventive product comprises the steps of first applying a first female pattern having cushions limited by regions of compressed material to a first web having at least one ply, followed by applying a second male pattern having protrusions of compressed material to a second web having at least one ply. In a following step, the first and second embossed webs are combined in a nested configuration placing the protrusions of compressed material inside the cushions.

In order to obtain the desired stabilizing effect, the cushions are at least partially filled by the male element or elements. The cushions and the male elements do not necessarily have to fit perfectly. Male elements have to be large enough to fill a sufficient area in order to stabilize the cushion. On the other hand, smaller male elements allow easier nesting of the two embossed webs and further contribute to an increased volume of the product. General devices for nesting two embossed webs are well known in the art. Such a known device may be modified using the inventive embossing units in order to produce firm and stabile cushions in accordance with the invention.

According to a preferred embodiment of the invention, the regions of compressed material have an elongated shape, especially are straight or curved lines or circles. Such an elongated shape has a width of from 0.1 to 10 mm, especially of from 0.1 to 5 mm and preferably of from 0.2 to 4 mm and may vary along- the elongation. The provision of lines has the advantage that the cushions are surrounded by compressed zones, the area of which can be minimized. The straight or curved lines can fully circumvent the cushions, however, according to a preferred embodiment of the invention, it is also possible to provide elongate regions of compressed material which do not fully surround each cushion. This measure is advantageous in order to maintain the softness of the product.

Alternatively, the regions of compressed material can also have the shape of individual dots positioned in linear arrangements. As a further alternative, the regions of compressed material could form individual elongated sections being positioned together to form the appearance of dashed lines. All those measures as described above serve to minimize the area of the compressed zones.

In an attempt to improve the optical appearance of the product, it is possible to provide a color on one or more plies, especially the top and bottom layer of the product, by using color printing technology or by using colored adhesives.

A further alternative or additional measure to improve the optical appearance is the provision of an embossing pattern on the first web and/or the second web which is sized to have an aesthetical appearance and which may improve the properties of the product. Such a design embossing is disclosed e.g. in EP 0 797 705 A1 and should be distributed sparsely enough not to influence too much the functional behaviour of the tissue product.

According to a preferred embodiment of the invention, there is a one single protrusion positioned in each cushion. However, it is also possible to provide a pattern of male protrusions on the second web such that two or more protrusions extend into one single cushion to stabilize it. Moreover it also should be possible that some cushions may be without any male protrusions.

The first and the second web of the multi-ply tissue paper may also comprise a pre-embossing pattern. Moreover, the multi-ply tissue paper according to the invention may also comprise a middle ply creating additional thickness, similar to the teaching disclosed in WO 02/103112 being sandwiched between the first and the second web.

According to a preferred embodiment the ratio between the surface area of a male protrusion and the surface area of a cushion is between 5% and 60%, preferably 15% and 40% and most preferably between 20% and 30%. These ratios proved to be sufficient to stabilize the cushions without reducing the high volume of the product.

According a preferred embodiment of the invention, the cushions have the shape of parallelograms or circles, triangles, hearts, or have a shape representing a symbol or a design pattern. The male protrusions can have the shape of diamonds, circles, triangles or of any other geometrical shape.

It is preferred to provide cushions with a surface area of between 0.5 and 2 $cm^2$; preferably of between 0.7 and 1.5 $cm^2$ and most preferably of between 0.8 and 1.2 $cm^2$. Cushions of this size are clearly visible by the user whereas cushions having a considerably larger size tend to collapse so that the optical appearance of a thick voluminous product might suffer. The male protrusions, on the other hand, have a density of between 0.5 and 30 protrusions per $cm^2$, preferably of between 0.5 and 10 protrusions per $cm^2$ and most preferably of between 1 and 1.5 protrusions per $cm^2$.

According to a preferred embodiment of the invention, the first web and the second web are bonded together by means of adhesive, preferably between the regions of compressed material of the first web and the second web. As an alternative, ply bonding could also be achieved by means of edge embossing or an additional mechanical ply bonding step or by ultrasonic ply bonding or by using needling technology.

However, the use of adhesive is preferred in order to limit the ply bonding to those parts of the tissue product in which the tissue is compressed, the remaining parts of the tissue product being soft to touch.

According to a preferred embodiment of the inventive paper converting device, the first embossing unit and/or the second embossing unit each comprise an embossing roller and an anvil roller, respectively, wherein the first embossing roller has at least one female element (recess) for generating the cushions surrounded by regions of compressed material and/or the second embossing roller has at least one male element for generating the protrusions of compressed material. In other words, the first embossing roller has at least one female element (recess) which produces the cushions.

According to another preferred embodiment of the invention, the first embossing roller and/or the second embossing roller can have both male and female embossing elements at the same time. This makes it possible to generate a complex pattern with e.g. an additional design embossing.

According to a preferred embodiment of the invention, the male elements forming the second pattern are designed as diamonds and/or the female elements (recesses) are designed as parallelograms.

Preferably, the paper converting device further comprises a marrying roll cooperating with and being positioned against the embossing roller of the second embossing unit. The paper converting device may also comprise a synchronisation unit.

BRIEF DESCRIPTION OF THE DRAWINGS

In the following, an embodiment of the invention will be described in detail based on several schematic drawings in which:

FIG. 1a is a schematic view of a web having a female pattern embossed;

FIG. 1b is a schematic cross-sectional view of an example of a web according to FIG. 1a;

FIG. 2a is a schematic view of a web having a male pattern embossed;

FIG. 2b is a schematic cross-sectional view of a web according to FIG. 2a;

FIG. 3 is a schematic view of an inventive paper converting device for producing a multi-ply web of tissue paper;

DETAILED DESCRIPTION OF A PREFERRED EMBODIMENT

Figure 4:
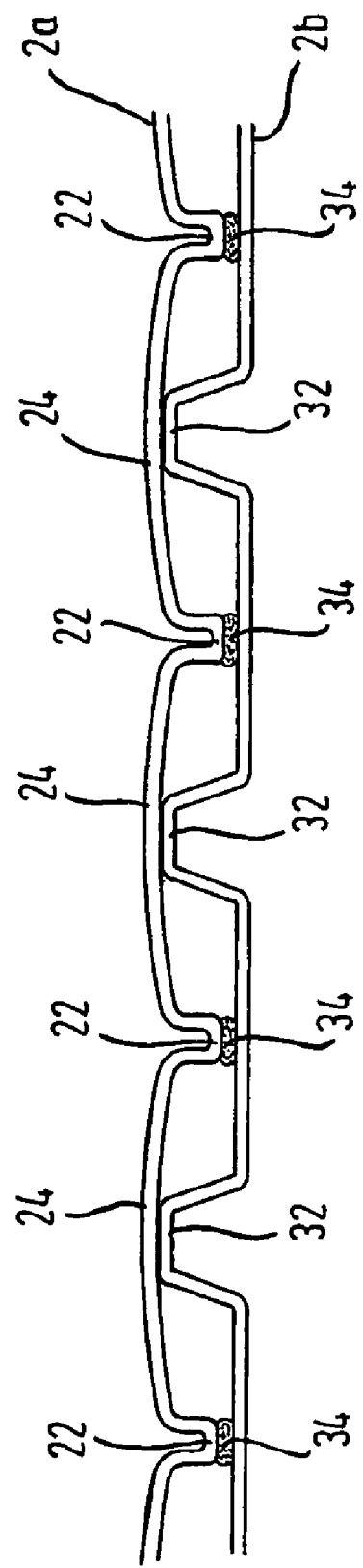
FIG. 4 a schematic cross-sectional view of an inventive multi-ply tissue product.

In the following, an embodiment of the invention will be described in detail with reference to the drawings. Throughout the drawings, the same elements will be denoted by the same reference numerals.

FIG. 1a is a schematic view of a web 2a having a female pattern embossed. The web may consist of one or a plurality of plies, preferably web 2a consists of two plies. FIG. 1b is a schematic cross-sectional view of the web 2a according to FIG. 1a. As can be seen from FIG. 1b, the embossed pattern comprises female elements embossed. As used herein, the term female elements indicates that the corresponding protrusions are generated by means of a so-called female embossing tool that has recesses into which the material of the planar initial product is pressed. Within these recesses, the embossing tool (embossing roller) can receive the material of the web without compressing it too much when the female embossing tool is placed against an anvil roll. In FIG. 1b, arrow A denotes the position of the embossing roller. The resulting web 2a has compressed areas 22 in those regions in which the embossing tool strongly presses the web material against an anvil roller. The regions 22 of the web material 2a are compressed and hence strengthened, whereas in those regions in which the embossing tool has recesses, cushions 24 are formed in which the web is not compressed or at least to a substantially lower extent than in regions 22.

The cushions 24 generated in such a way effect the thickness or bulk of the web 2a. These cushions tend to collapse and lose shape when rolling the web 2a. In order to keep the cushion appearance, cushions of an inventive tissue are stabilized by filling them with material. The filling material is provided by a second web 3a having male protrusions.

FIG. 2a shows a schematic view of a web 3a having a male pattern embossed. In FIG. 2b a schematic cross-sectional view of the web according to FIG. 2a is shown. The pattern of the web 3a comprises male elements 32 designed as diamonds. The elements 32 are raised with respect to their surroundings. Such an embossment is called a male embossment. Contrary to the above-described female embossing tool, a male embossing tool is formed with elements extending from the surface of the roller which generate compressed protrusions in the web of material. The arrow B in FIG. 2b shows the direction in which an embossing roller is applied to the web 3a in order to generate the protrusions 32 which, in the specific embodiment shown in FIG. 2a, have the shape of diamonds.

In order to stabilize the cushions shown in FIG. 1a, 1b, the diamonds as depicted in FIGS. 2a, 2b are placed inside the cushions 24. The combination of both patterns provides a double-sided tissue paper with a pillow or cushion effect. To achieve such results, the patterns of the embossed webs 2a, 3a have to be matching in design. Further, the two webs 2a, 3a have to be combined together in an exact and synchronized manner.

FIG. 3 shows a schematic view of an inventive paper converting device 1 for producing the inventive multi-ply web of tissue paper. The paper converting device 1 comprises a first embossing unit 12, a second embossing unit 13, and a lamination unit 14. The first embossing unit comprises an embossing roller 122 and an anvil roller 124. The second embossing unit comprises an embossing roller 132 and an anvil roller 134. The second embossing unit 13 might further comprise a pre-embossing unit 136. This additional embossing unit might be used in order to enhance the embossing of the male pattern.

A first web 2 comprising one or more plies, preferably two plies, is supplied to the anvil roller 124 of the first embossing unit. The incoming web 2 is embossed between the rollers 122, 124. Although only shown schematically in FIG. 3, there is a difference between embossing rollers 122 and 132. The embossing roller 122 is the so-called female embossing tool having recesses which form the cushions 24 as shown in FIG. 1a and FIG. 1b.

A second web 3 comprising two plies is supplied to the embossing unit 13. The incoming web 3 is embossed between the rollers of the pre-embossing unit 136 as well as the rollers 132, 134 of the second embossing unit 13. A pre-embossing unit might serve to provide one web with a micro-embossing pattern before entering the embossing unit 12 or 13. In the example according to FIG. 3, web 3 is pre-embossed. However, it should be noted that it is also possible to provide such a pre-embossing station for both webs or not to pre-emboss any of the webs. For bonding together the two embossed webs, different possibilities should be mentioned. Preferably, an adhesive is applied to generate a ply bonding between the webs. Therefore, glue application rollers 15 are provided which apply an transparent or colored adhesive to either the first web 2 or second web 3. In the first case, the adhesive is applied to the regions 22 of compressed material, whereas in the later case, the adhesive is combined to the tops of the male protrusions 32. As a further alternative, it is also possible to apply an adhesive to both the male protrusions 32 and regions 22 of compressed material. In the example shown in FIG. 3, the adhesive is applied by means of the glue application rollers 15 to web 3 such that the male protrusions receive adhesive on their tops.

In a next step, the embossed webs 2a, 3a are combined together to form a nested configuration. A roller 142 serves as a marrying roller. By passing through the nip between the embossing roller 132 and the marrying roller 142, the two webs 2a, 3a are pressed together.

The multi-ply tissue 4a formed in such a way preferably comprises two plies having a female pattern embossed as well as two plies having a male pattern embossed. The web 4a might be further processed by applying color and/or design patterns.

Instead of a web 2 and/or a web 3 having two plies, webs having only one ply or webs having more than two plies might be processed in the embossing units 12, 13. The number of plies in web 2a does not necessarily correspond to the number of plies in web 3a.

The rollers of the first embossing unit 12 and the second embossing unit 13 are synchronized by a synchronization unit (not shown in FIG. 3) so that the male protrusions 32 enter the cushions and stabilize them in the desired way.

FIG. 4 shows a specific example of a four-ply product consisting of two webs 2a and 2b both of which have two plies. Web 2a is female embossed with compressed areas 22 surrounding the cushions 24, whereas in web 2b male protrusions 32 are formed which project into the cushions 24 and stabilize them. In the example according to FIG. 4, the ply bonding is achieved by means of the application of adhesive 34 to the tops of the regions 22 of compressed material surrounding the cushions 24.

Figure 5:
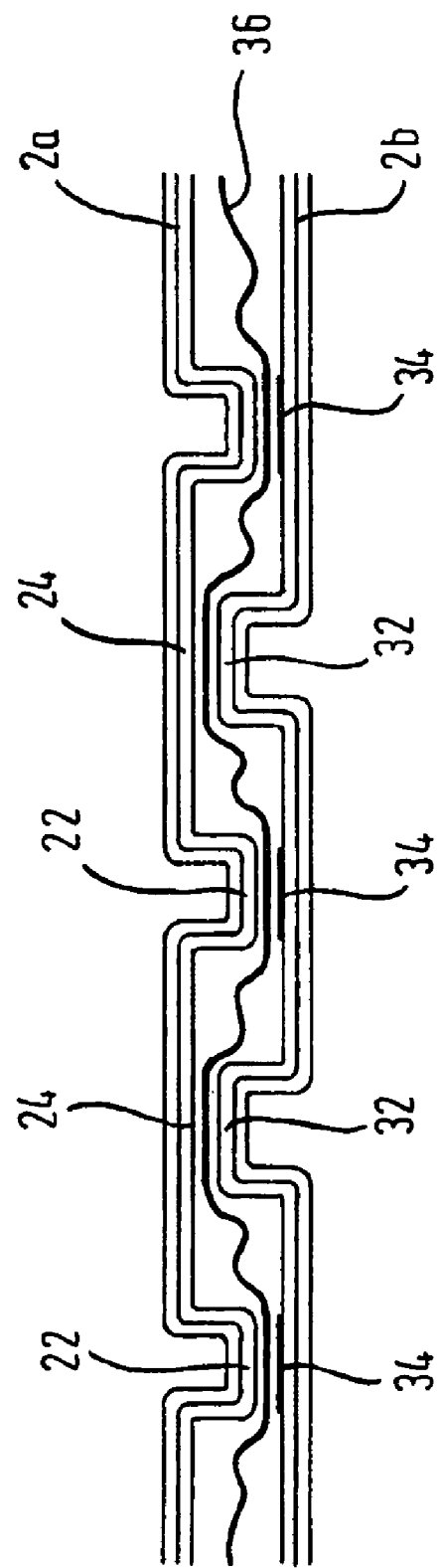
FIG. 5 is a further schematic cross-sectional view of an inventive multi-ply tissue product.

FIG. 5 shows a cross-sectional view similar to that according to FIG. 4. In addition to the embodiment according to FIG. 5, a further ply 36 is provided which is also embossed but does not have an embossing pattern which corresponds to the design of the pattern of webs 2a and 2b. This so-called volume-embossed middle ply can serve to further increase the volume of the product and to make smaller the dimensions of the male protrusions 32 in order to stabilize the cushions 24. For the application of a volume-embossed middle ply reference is made to EP 1 395 706.

In all exemplary embodiments as shown and described above, two webs are combined together in a well-defined way. A first web having a female embossing pattern and forming cushions surrounded by regions of compressed material is combined with a second web having male protrusions such that the male protrusions: enter into the cushions and stabilize them. The surface area of the male protrusions should be considerably smaller than the surface of the cushions. Preferably the surface area of each male protrusion is between 5% to 60% of the surface area of each cushion.

The multi-ply tissue paper according to the invention shows high strength and absorption, an improved softness, haptic and bulk thickness and provides a good feeling to the user. The product also has a good optical appearance and a so-called reversibility.

The invention claimed is:

1. A multi-ply web of tissue paper having at least two plies comprising:
    A first web (2a) having at least one ply and being provided with a first embossing pattern forming cushions (24) defined by regions (22); and
    a second web (3a) having at least one ply and being provided with a second pattern with protrusions (32) of compressed material; wherein
    the first web and the second web are combined together such that the protrusions of the compressed material (32) of the second web (3a) are positioned inside the cushions (24) defined by the regions of compressed material (22),
    wherein an angle of an internal corner of the protrusions is larger than an angle of an internal corner of the cushions.

2. The multi-ply web of tissue paper according to claim 1, wherein the regions (22) of compressed material have an elongated shape and are formed as straight or curved lines or circles.

3. The multi-ply web of tissue paper according to claim 2, wherein the elongated regions (22) of compressed material do not fully surround each cushion.

4. The multi-ply web of tissue paper according to claim 1, wherein the regions (22) of compressed material have the shape of individual dots or circles positioned in linear arrangement.

5. The multi-ply web of tissue paper according to claim 1, wherein the regions (22) of compressed material form individual elongated sections being positioned together to form the appearance of dashed lines.

6. The multi-ply web of tissue paper according to claim 1, additionally comprising a color printing on the first web (2a) and/or the second web (3a).

7. The multi-ply web according to claim 1 additionally comprising a colored adhesive on one or more plies.

8. The multi-ply web of tissue paper according to claim 1, additionally comprising an embossing pattern on the first web and/or the second web which embossing pattern is sized and arranged to have an aesthetical appearance.

9. The multi-ply web of tissue paper according to claim 1, additionally comprising a pre-embossing pattern on the first and/or the second web before the embossing is formed.

10. The multi-ply web of tissue paper according to claim 1, additionally comprising at least a third ply sandwiched between a top ply and a bottom ply.

11. The multi-ply web of tissue paper according to claim 1, wherein there is one single protrusion (32) positioned within each cushion (24).

12. The multi-ply web of tissue paper according to claim 1, wherein the ratio between the surface area of a protrusion (32) and the surface area of a cushion (24) defined by the regions is between 5% and 60%.

13. The multi-ply web of tissue paper according to claim 1, wherein the cushions (24) have the shape of parallelograms or circles or have a shape representing a symbol or a design pattern.

14. The multi-ply web of tissue paper according to claim 1, wherein the cushions (24) defined by the regions have a surface area of about 0.5 to 2.0 cm$^2$.

15. The multi-ply web of tissue paper according claim 1, wherein the protrusions (32) have a density of 0.5 to 30 protrusions per cm$^2$.

16. The multi-ply web of tissue paper according to claim 1, wherein the first web (2a) and the second web (3a) are bonded together by means of adhesive.

17. The multi-ply web of tissue paper according to claim 16, wherein ply bonding of the first and the second web is carried out by means of adhesive between the region of compressed material (22) of the first web and the second web.

18. The multi-ply web of tissue paper according to claims 1, wherein the first web (2a) and the second web (3a) are bonded together by ultrasonic ply bonding or by needling technology.

* * * * *